United States Patent [19]

Johnson

[11] Patent Number: 5,063,979

[45] Date of Patent: Nov. 12, 1991

[54] ACU-PLANER ATTACHMENT

[76] Inventor: Joe C. Johnson, Box 67, Springer, Okla. 73458

[21] Appl. No.: 444,404

[22] Filed: Dec. 1, 1989

[51] Int. Cl.5 .................................................. B27C 9/02
[52] U.S. Cl. .................................... 144/1 F; 30/47 S; 144/134 D; 144/114 R
[58] Field of Search ............... 144/1 F, 134 D, 136 C, 144/114 R; 30/47 S

[56] References Cited

U.S. PATENT DOCUMENTS 4,685,496  8/1987  Livick .................................. 144/1 F
4,729,698  3/1988  Haddon .............................. 144/1 F Primary Examiner—W. Donald Bray

[57] ABSTRACT

An accessory attachment for electric hand planers, composed of two elemental components: one, the shoe plate securable to the planer, which has an incorporated canting angle, two is the actual "fence" which has the desired miter angle incorporated into it, with capacity for any of its angles to be varied in order to produce the desired joint angle, or desired beveled edge, on wood, wood composites, plastics, etc., as the fence unit is maneuvered along a guiding straight edge.

3 Claims, 3 Drawing Sheets

ACU-PLANER ATTACHMENT

BACKGROUND OF INVENTION

This invention pertains in general to the art of hand tools and more particularly as a novel accessory tool for an electric hand planer. An attachment so designed and built that the hand planer will more precisely maintain an accurate angled cut from inches to any number of feet in length, with its cut limited only to the planer's blade width for breadth of cut.

The guiding attachment normally associated with the planer are commonly referred to as the "fence". Generally these "fences" afford little stability and little or no accuracy pertaining to the angle and depth of cut.

This invention provides stability to maintain the integrity of the angle of cut and also the necessary accuracy for the depth of the cut.

Another problem inherent with planing of "end grain" or in edge planing with "plywood" type products, is what edge "grain nap" does with "throwing off", and producing a raising of the planer's bed guidance system, thereby manipulating the desired results of the planer.

This invention's intention by tilting or canting "out of line" the planing action, does virtually annuls this handicap, so that a more accurate joint, miter, etc. is achieved.

SUMMARY

In general the purpose of this invention, in or out of the shop setting, is to provide a means for the hand planer operator to fulfill a skillful art of jointery as needed in the guidance of a precise angle of cut, while also providing and maintaining accuracy in the linear depth of its planing cut with the aid of a guiding straight edge.

Another objective is an attachment that fixes the planer in such away that the planer blade or blades effect the cleanest or none burring and chipping results possible for the material being worked.

Another objective of this invention is to also provide a "fence" available to the operator in a single attachment in one unit, one that is quickly and easily attached and removed, by means of two, but not limited to two, set screws, bolts, etc.

A related objective is to provide the operator with an attachment which gives weight and heft balance to his planer, thereby stabilizing its movements, especially when it is held somewhat over the edge of the material being worked.

Other advantages and objective will become apparent in the perusal of the following drawings and specifications.

BRIEF DESCRIPTION OF THE DRAWINGS

The drawings shown are for fixed models of the preferred embodiment.

DETAILED DESCRIPTION OF THE PREFERRED EMBODIMENT

In accordance with the invention the tool attachment called an ACU-PLANER is attachment composed of two basic interchangeable elements, using and incorporating two angles which can be varied, each element is responsible for establishing its own unique angle. When the two elements are secured into one unit, together they are compounding the planer's angle, which then produces the desired cutting affect.

Figure 4:
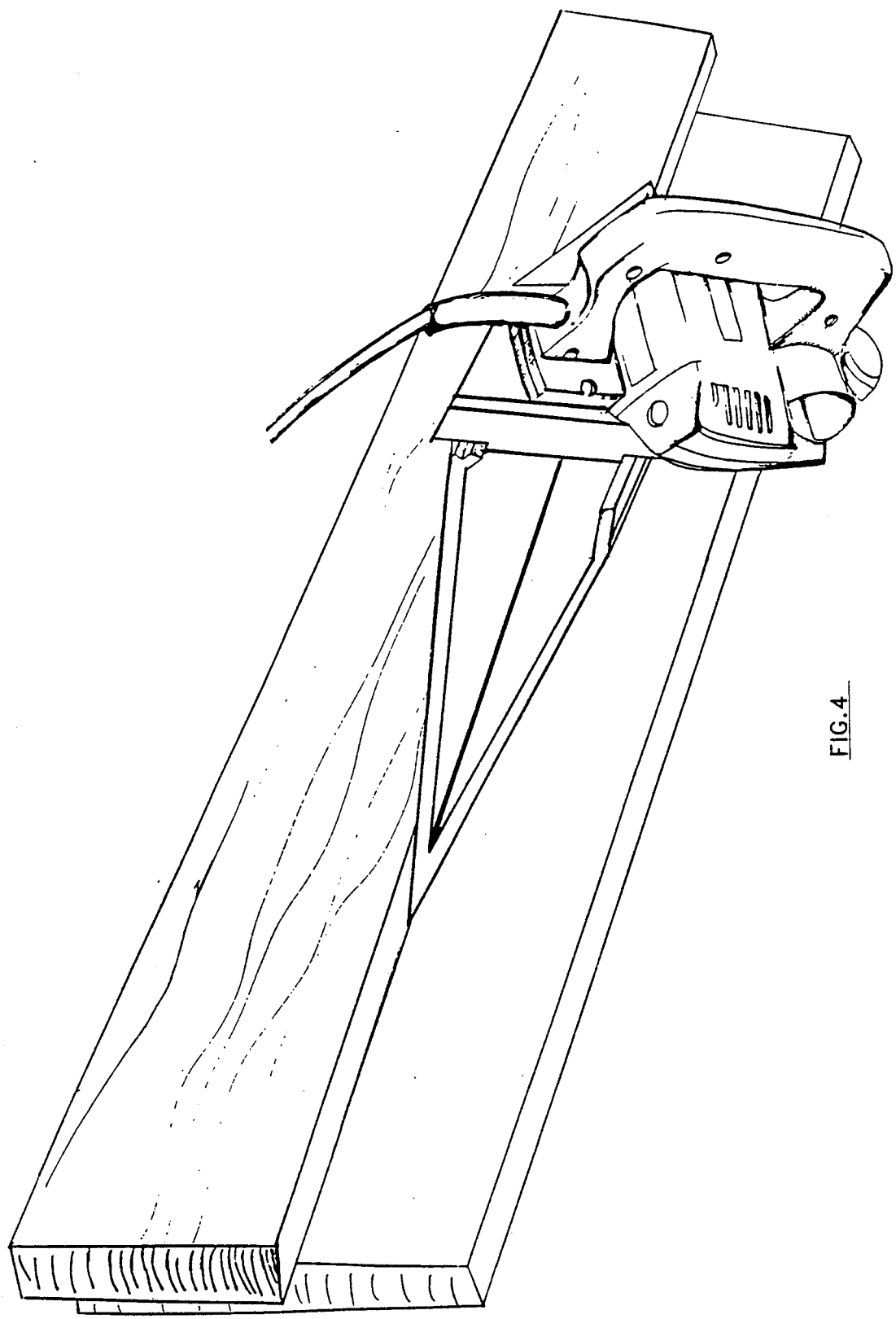
FIG. 4 is a pespective view showing planer mounted onto the invention.

Element 1 as shown in FIGS. 1-5 is the removable shoe having a flat base and raised sides for contacting the base of a planer to be used in conjunction with the device. The base plate of the planer is releasably secured to the shoe by means of set screws, bolts or the like (not shown). The shoe can be designed to accommodate various configurations of manufactured planer bases, and is produced with varying canting angles, by changing optional interchangeable shoes. In this manner, various angles of cut can be achieved in either direction of travel of the planer attachment or a guide surface (as shown in FIG. 4).

Its preferred dimensions are ¾ of an inch in thickness of a parallelogram 4 inches by 4 ½ inches.

Element 2 as shown on FIGS. 1,2,3, and 5 is the fence, which is a "take off" of the basic 90 degree "angle iron". It then is modified to facilitate the shoe and desired angle of miter the planer is to produce. The fence 2 maintains the integrity, between its base and the material being worked and also between the fencing side and the straight edge employed for the purpose of guidance.

The preferred dimensions are 3 inches on the base by 24 inches in the length, its other dimensions are facilitating measurements.

Figure 1:
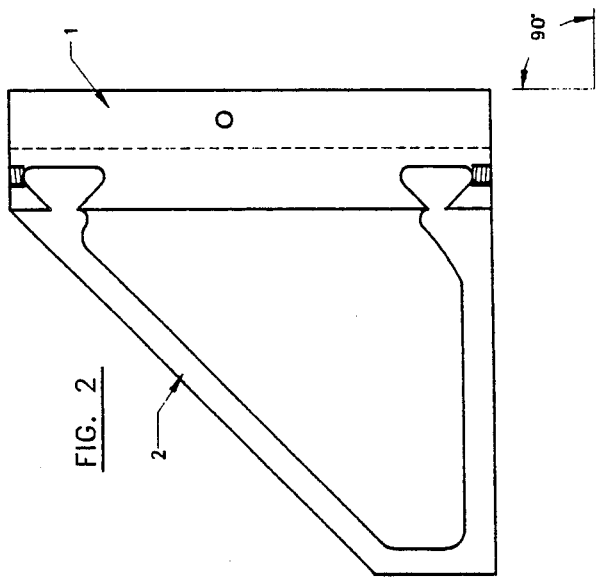
FIG. 1 is end view, showing dovetailing of shoe, with a ridged fence of forty five degrees miter to the planer base.
Figure 2:
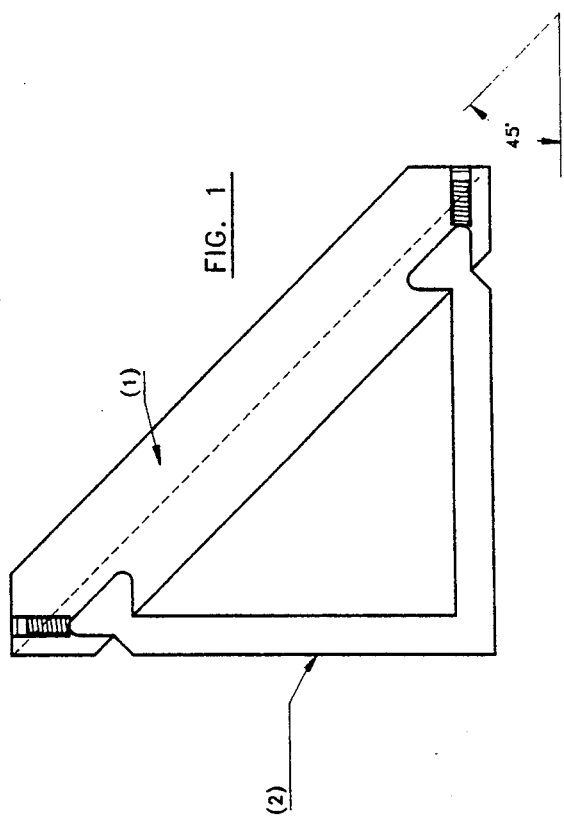
FIG. 2 is end view, showing dovetailing of shoe, with a ridge fence of ninety degrees miter to the planer base.
Figure 5:
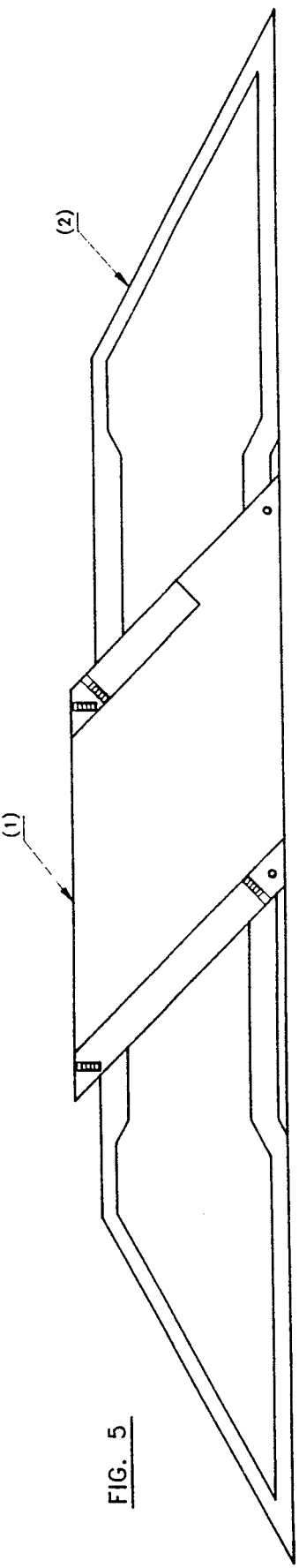
FIG. 5 is a side view of the invention.
Figure 3:
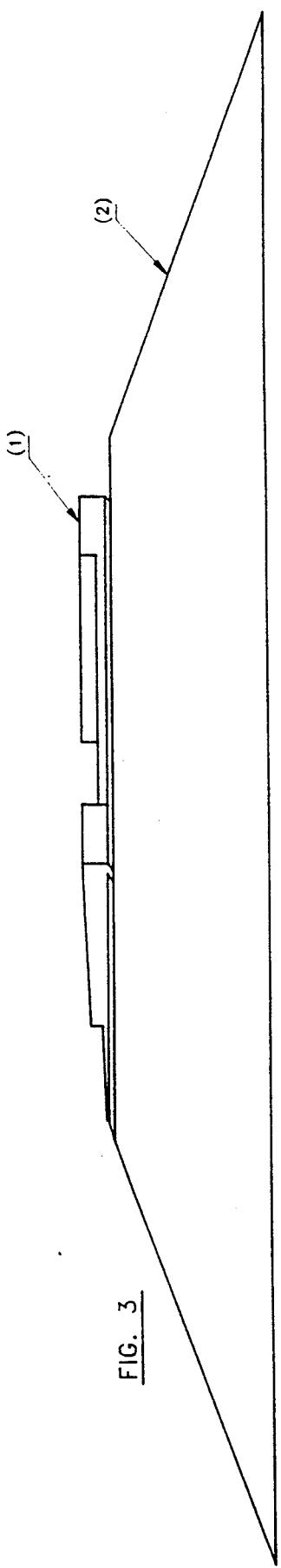
FIG. 3 is a top view of the accessory.

As shown in FIG. 1, the fence is comprised of two attached planar sides which define guide means. In FIG. 1, the angle between the respective sides of the fence 2 is 90°, whereas in FIG. 2, the angle is shown to be 45°. Other angles may be utilized, all within the scope and intent of the invention. The shoe 1 is shown as being releasably attached to the fence by a dovetail connection and set screws 3, but other connections may be used for this purpose.

FIG. 4 shows the ACU-Planer attachment in use with a hand planer performing an angled meter cut on a workpiece. Because of the configuration and mass of the attachment, it enables the operator to achieve a more accurate straight line angled cut.

Having described my invention I claim:

1. A guide tool accessory fore hand tools comprising: guide fence means defining at least two guide sides, each said guide side having opposite ends of which one respective end of each is attached to the other at an angle;

A removable shoe, said shoe comprising on one side thereof a base and upstanding sides for supporting a hand tool, and having means on the opposite side opposite side thereof for removable attachment to the opposite ends of said guide sides;

means for securing said tool to said shoe; and means for securing said shoe to said guide fence means, whereby said fence means and said shoe from an integral unit for slidable supporting said tool at an angle relative to a workpiece to be engaged by said tool.

2. The tool accessory of claim 1, wherein the angle of attachment of said sides is variable.

3. The tool accessory of claim 1, wherein said one side of said base is flat.

* * * * *